(12) United States Patent
Atkins

(10) Patent No.: US 9,338,445 B2
(45) Date of Patent: May 10, 2016

(54) METHOD AND APPARATUS FOR FULL RESOLUTION 3D DISPLAY

(75) Inventor: Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 683 days.

(21) Appl. No.: 13/562,064

(22) Filed: Jul. 30, 2012

(65) Prior Publication Data

US 2013/0033491 A1 Feb. 7, 2013

Related U.S. Application Data

(60) Provisional application No. 61/515,085, filed on Aug. 4, 2011.

(51) Int. Cl.
*H04N 15/00* (2006.01)
*H04N 13/04* (2006.01)
*G09G 3/00* (2006.01)
*G09G 3/36* (2006.01)

(52) U.S. Cl.
CPC ........... *H04N 13/0431* (2013.01); *G09G 3/003* (2013.01); *G09G 3/3607* (2013.01); *H04N 13/0434* (2013.01)

(58) Field of Classification Search
None
See application file for complete search history.

(56) References Cited

U.S. PATENT DOCUMENTS

| | | | |
|---|---|---|---|
| 5,218,386 A | 6/1993 | Levien | |
| 5,264,964 A | 11/1993 | Faris | |
| 5,537,144 A | 7/1996 | Faris | |
| 5,917,562 A | 6/1999 | Woodgate | |
| 6,002,518 A | 12/1999 | Faris | |
| 6,285,368 B1 * | 9/2001 | Sudo | 345/419 |
| 6,734,923 B2 | 5/2004 | Kwon | |
| 7,002,642 B2 | 2/2006 | Jung | |
| 7,697,203 B2 | 4/2010 | Cha | |
| 2004/0263968 A1 * | 12/2004 | Kobayashi et al. | 359/462 |
| 2006/0284872 A1 | 12/2006 | Brown Elliott | |
| 2006/0285026 A1 * | 12/2006 | Robinson | 349/15 |
| 2007/0188711 A1 * | 8/2007 | Sharp et al. | 353/8 |

(Continued)

FOREIGN PATENT DOCUMENTS

| | | |
|---|---|---|
| DE | 10057102 | 5/2002 |
| JP | 7-307959 | 11/1995 |

(Continued)

OTHER PUBLICATIONS

Ken McCann, Jeff Gledhill, Adriana Mattei, Stuart Savage, "Beyond HDTV: Implications for Digital Delivery", Jul. 2009, ZetaCast Ltd., pp. 1-85.*

G. H. Atwood, W. A. Davis, "Image Expansion Using Interpolation & Heuristic Edge Following", Jul. 20, 1989, IET, Third International Conference on Image Processing and its Applications, 1989, pp. 664-668.*

*Primary Examiner* — Robert Bader

(74) *Attorney, Agent, or Firm* — Larry E. Henneman, Jr.; Henneman & Associates, PLC

(57) ABSTRACT

Method and apparatus for displaying full resolution, high definition (HD) three-dimensional (3D) images in a liquid crystal display (LCD) device by alternating polarization (or spectrum) of pixels present in a 4K LCD device. A first method comprises spatially dividing pixels by alternating polarization of pixels present in a 4K LCD device utilizing vertical, horizontal and checkerboard interlacing techniques. Another method comprises spatially alternating two sets of narrow band-pass color filters RGB1 and RGB2. RGB1 and RGB2 are balanced to minimize need for color balancing processing.

20 Claims, 5 Drawing Sheets

(56) References Cited

U.S. PATENT DOCUMENTS

| | | | |
|---|---|---|---|
| 2008/0002255 A1* | 1/2008 | Tavor et al. | 359/464 |
| 2008/0036853 A1* | 2/2008 | Shestak et al. | 348/51 |
| 2008/0037120 A1* | 2/2008 | Koo et al. | 359/463 |
| 2008/0117290 A1* | 5/2008 | Mazza | 348/47 |
| 2009/0058873 A1 | 3/2009 | Brown Elliott | |
| 2009/0316114 A1* | 12/2009 | Richards | 353/7 |
| 2011/0037784 A1* | 2/2011 | Shiomi | 345/690 |
| 2012/0044325 A1* | 2/2012 | Tatsuta et al. | 348/43 |
| 2013/0002650 A1* | 1/2013 | Ko | G02B 27/2264 345/419 |

FOREIGN PATENT DOCUMENTS

| | | |
|---|---|---|
| JP | 11-285031 | 10/1999 |
| JP | 2007-300658 | 11/2007 |
| JP | WO2009157224 | * 12/2009 |
| JP | WO2010131313 | * 11/2010 |
| WO | 2008073000 | 6/2008 |
| WO | 2008100826 | 8/2008 |

* cited by examiner

METHOD AND APPARATUS FOR FULL RESOLUTION 3D DISPLAY

CROSS REFERENCE TO RELATED APPLICATIONS

This Application claims the benefit of priority to related, Provisional U.S. Patent Application No. 61/515,085 filed on Aug. 4, 2011 entitled "Method and Apparatus for Full Resolution 3D Display" by Robin Atkins, hereby incorporated by reference in its entirety.

BACKGROUND OF THE INVENTION

1. Technical Field of the Invention

The present invention relates in general to methods and apparatuses for achieving a full resolution three dimensional (3D) display in liquid crystal display (LCD) devices. More specifically, the present invention relates to a method and apparatus for generating a full resolution, high definition image in a 4K LCD device utilizing vertical, horizontal and checkerboard interlacing techniques.

2. Description of the Related Art

A wide variety of stereoscopic display devices are available. The basic requirement of the stereoscopic display devices are to present images separately to the left and right eyes. Most 3D LCD panels are operated by displaying left and right viewpoints sequentially. The correct viewpoint is sent to the eye utilizing either active or passive glasses. However, the LCD panels have an inherently slow update speed on the order of 20 ms. At 120 Hz, the update speed corresponds to approximately 2.5 frames and at 240 Hz the update speed corresponds to approximately 5 frames. This slow updating of the pixel transition results in incomplete extinction of left and right viewpoints, which in turn results in crosstalk and degraded 3D image quality. Further, with LCD technologies, the images are typically linearly polarized, which will be sufficient only for applications where the viewer's head rotation is fixed near to vertical.

SUMMARY OF THE INVENTION

The present inventor has realized the need to improve 3D displays. To minimize the limitations found in the prior art, and to minimize other limitations that will be apparent upon the reading of the present invention, a method and apparatus for displaying full resolution, high definition (HD) three-dimensional (3D) images in a liquid crystal display (LCD) device by alternating polarization of pixels present in a 4K LCD device is provided. A first method comprises alternating polarization of pixels present in a 4K LCD device utilizing vertical, horizontal, or checkerboard interlacing techniques.

The checkerboard interlacing technique may, for example, group multiple primary colors in a single channel for minimizing the interlacing artifacts such as motion breakups. This technique does not require two pixel translations for each video frame as typically occurring in some current systems, resulting in less crosstalk. This technique may also alternately include a fast pixel updating feature by spatially dividing the 4K panel. The result is a reduction in 3D crosstalk and the production of better image quality. Devices implementing the invention may also include a facility to display two dimensional (2D) images (e.g., a data controlled software switch to configure the device for 2D or 3D mode, or a manual override to set 2D or 3D mode).

The method of the invention may comprise spatially dividing the left viewpoint and right viewpoint of the 4K LCD device. An apparatus designed for the method may comprise at least one illumination source for producing light and at least one polarizer panel utilized for polarization orientation of the light. The apparatus may further comprise a plurality of pixels (e.g., an LCD panel, or an array of pixels) for modulating the light according to image data, and at least one analyzer panel having analyzers arranged in alternating directions (e.g. +/−45 degrees to an orientation of the polarizing panel). The orientation of the at least one analyzer panel in an alternating direction to the at least one polarizer panel spatially divides the left viewpoint and right viewpoint of the 4K LCD device into two full resolution views. The 4K LCD device may be, for example, a standard 4K device modified with an alternating direction analyzer. However, to reach full resolution for both left and right images, the 4K device only needs 1920×2 (3840) pixels horizontally and 1080 pixels vertically. The invention may also be implemented to full resolution or higher using an Ultra High Definition UHD panel (e.g., and 8 k UHDTV panel).

The second method comprises alternating spectral properties of light modulated by the 4K LCD device. This may be accomplished utilizing at least two sets of narrow band-pass color filters designed for red (R), green (G) and blue (B) color signals and spatially dividing the left and right viewpoints of the 4K liquid crystal device (LCD) device. This may also be achieved, at least in part by the use of different color backlights comprising, for example, and of LEDs, OLEDs, and/or a light source and quantum dots, any of which may also be combined with the use of filters. The filters are named RGB1 and RGB2 and correspond to a first and second view (e.g., left and right views) of the resulting display.

There may be several bands of each primary for each viewpoint. For example, RGB1 may comprise one pass band of blue light, one pass band of green light, and one pass band of red light, while RGB2 may comprise two pass bands of blue light, two pass bands of green light and one pass band of red light. The red pass band of RGB2 may comprise, for example, a "high pass" filter (passes all visible wavelengths longer than a designated first wavelength passed by the filter) that passes wavelengths longer than those passed by the red filter of RGB1. RGB1 and/or RGB2 filters may also include "notches" that block passage of light between different or same colors of the same channel/view.

It is desirable for both sets of RGB1 and RGB2 to have identical or near identical color primaries and white point, and the selection of the number and width of bands passed and/or blocked by RGB1 and RGB2 are preferably selected to cause or facilitate that match. This feature minimizes the need for color balancing processing. The viewer's 3D glasses have corresponding filters, or filters that encompass the pass bands of the corresponding view, while excluding light passed in the other channel/view.

In one embodiment, the combination of RGB emitted light and the filters on the glasses for both eyes are selected to be a good match for color balance (both primaries and white point).

In another embodiment, one set of primaries are invisible to the naked eye (for example, infrared). The invisible primaries become visible when wearing glasses that perform, for example, a frequency division bringing the wavelength into the visible spectrum. In one embodiment, visible primaries projected by a display are used to establish a 2D image and invisible primaries projected by the display are converted to the visible spectrum and used in combination with the visible primaries to provide 3D imagery. In this way, someone watching without glasses sees a 2D image, and someone with glasses sees a 3D image.

In another embodiment, one set of primaries may be P3 color space (for example), and the other set of primaries may be different. The color spaces may be used one in each channel of a 3D display. In 2D embodiment, all six primaries are utilized to provide 6 primary wide color gamut 2D viewing (e.g., Visual Dynamic Range (VDR) which matches the Human Visual System in gamut, contrast, and other qualities).

The at least two sets of narrow band-pass color filters may be arranged in a vertical or horizontal interlaced pattern, or other patterns such as checkerboard. Some advantages can be realized with patterns that intermix the sub-pixel filters (e.g., R1G2B1R2G1B2). The apparatus may comprise at least one polarizer panel utilized for selectively allowing the passage of certain orientation of polarized light as modulated by a plurality of LCD pixels (or other light valve apparatus) by image data.

One objective of the invention is to provide method and apparatus that would achieve a full resolution and high definition (HD) 3D display in a liquid crystal display device utilizing polarization of pixels in a 4K panel which would be achieved via interlacing. The interlacing may be accomplished, for example, vertically, horizontally, in a checkerboard, or another pattern (potentially even a randomized pattern so long as the randomization does not introduce an architectural artifact such as, for example, a larger than HD resolution pixel of/in a single channel). A checkerboard interlacing technique may be used for grouping multiple primary colors. The checkerboard pattern may include, for example a set of RGB1 primaries at/on a first set of "squares" (e.g., red squares) of the checkerboard and a set of RGB2 primaries at/on a second set of "squares" (e.g., black squares) of the checkerboard. The checkerboard pattern helps reduce or minimize interlacing artifacts such as motion breakups.

Another aspect of the invention is to provide method and apparatus that would have a fast pixel updating feature by spatially dividing the panel (e.g., 4 k panel) to reduce 3D crosstalk and produce better image quality. Yet another aspect of the invention is to provide method and apparatus that would also provide a facility to display two dimensional (2D) images when the viewer is not wearing the polarized glasses.

Yet another aspect of the invention would be to provide for the display of two different full resolution images, a first viewer viewing a first image using glasses having the same filters for each eye matching/encompassing the first image channel, and second viewer viewing a second image using glasses having filters for each eye matching/encompassing the second image channel. These viewers may utilize the same sound track or have different soundtracks listened to through personal audio devices (e.g., i-pod, i-phone, cell phone, mobile device, computer, wired/wireless connections to the display/mobile device, etc.)

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

The embodiments of the present invention have been provided for the purposes of example, illustration and best mode description. The embodiments are not intended to be exhaustive or to limit the invention to the precise form disclosed. Many modifications and variations are possible in light of the present disclosure. It is intended that the scope of the present invention not be limited by this detailed description, but by the claims and the equivalents to the claims appended hereto.

Figure 1:
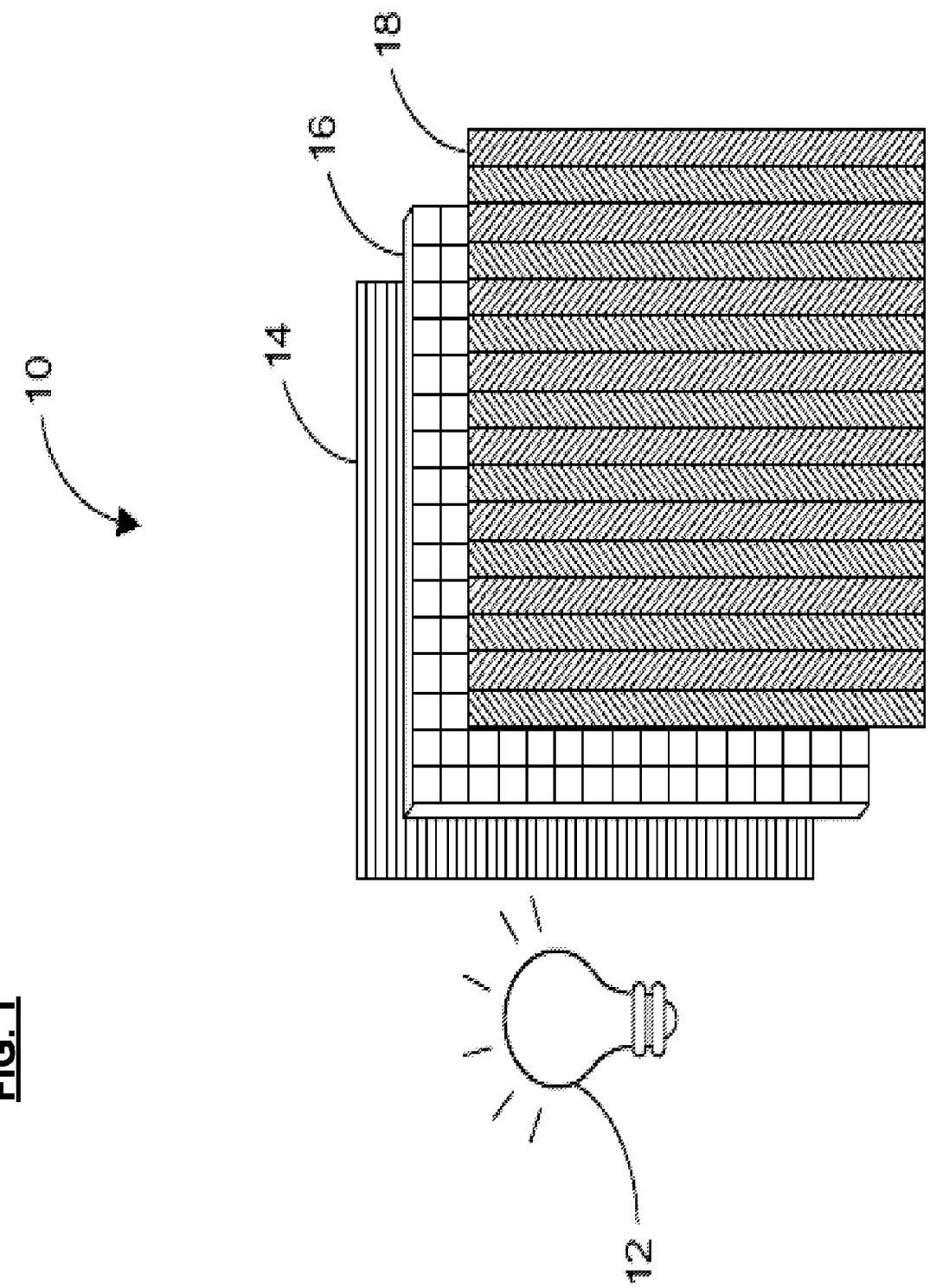
FIG. 1 is a schematic representation of an embodiment of the present invention, illustrating an apparatus for displaying full resolution, high definition (HD) three-dimensional (3D) images in a liquid crystal display (LCD) device by alternating polarization of pixels present in a 4K LCD device.

FIG. 1 is a schematic representation of an embodiment of the present invention, illustrating an apparatus 10 for displaying a full resolution, high definition (HD) three-dimensional (3D) images in a liquid crystal display (LCD) device by alternating polarization of pixels present in a 4K LCD device. The apparatus 10 comprises at least one illumination source 12 and at least one polarizer panel 14 utilized for selectively allowing passage of certain orientation of polarized light. The apparatus 10 further comprises an LCD array of pixels 16 for displaying images and at least one analyzer panel 18. As shown, the analyzer panel 18 is, for example, arranged with a repeating pattern of alternating polarization directions relative to the at least one polarizer panel 14. The orientation of the polarization directions of the at least one analyzer panel 18 in are adapted for spatially dividing the left and right viewpoints of the 4K LCD device.

The illumination source may take any form including any of a constant, globally dimmed, or locally dimmed light source. The light source by be CCFL, LED, OLED, or quantum dots energized by blue/ultraviolet lights and/or electrically energized, for example.

The 4K LCD device is designed for providing a display resolution of 3840×2160 pixels. The left viewpoint of the 4K LCD device provides a resolution of 1920×1080 pixels. The right viewpoint of the 4K LCD device provides a resolution of 1920×1080 pixels. Pixels of the left view/viewpoint (e.g., odd columns of pixels of the LCD array) are energized with pixel data from the left view. Pixels of the right view/viewpoint (e.g., even columns of pixels of the LCD array) are energized with pixel data from the right view. Other patterns of pixel energization may be utilized, but preferably each pixel energized for a particular view is also physically aligned with a portion of the polarizer/analyzer oriented specifically for that view.

In one embodiment, when using a locally (or globally) dimmed backlight, pixels of each view are also energized differently via a compensation that accounts for differences in illumination for each pixel or groups of pixels because of the locally dimmed backlight (e.g., a level of illumination for a left view pixel may be compensated differently than a right view pixel in a same general area because of different backlighting and/or because of differences in the views). Compensation may be applied for each pixel or groups of pixels. Compensation may be calculated for each pixel or for a group of pixels and then adjusted for left/right view particulars.

The apparatus 10 may be adapted for displaying two-dimensional (2D) images without using 3D glasses. In such embodiments, the image may be displayed at 4 k resolution, or pixels may be merged in a manner that results in a standard HD image being displayed.

A method for displaying full resolution, high definition (HD) three-dimensional (3D) images in a liquid crystal display (LCD) device comprises alternating polarization of pixels present in a 4K LCD device utilizing an interlacing technique. The interlacing technique may be, for example, any one of vertical, horizontal, or checkerboard interlacing techniques.

The method may further comprise spatially dividing the left and right viewpoints of the 4K LCD device. The method is advantageous for utilization of techniques such as linear or circular polarization. Circular polarization is independent of head rotation of a viewer.

When a viewer is wearing 3D glasses for viewing a 3D image, there is approximately 50% loss of light output due to only half the light being allowed through each eye by the 3D glasses. The method provides no loss of light output to the viewer compared to a standard 2D panel when they are not wearing glasses because the invention performs the analyzer function and polarization control for the different views with a single polarizing panel.

If the viewer is not wearing 3D glasses (not shown), the apparatus 10 can be controlled by a 2D mode to display either HD with a resolution of 1920×1080 pixels by controlling sets of four adjacent pixels together or 4K modes by controlling each pixel individually. In addition, when utilizing a checkerboard interlacing technique used for grouping multiple primary colors in a single channel minimizes interlacing artifacts such as motion breakups.

Figure 2:
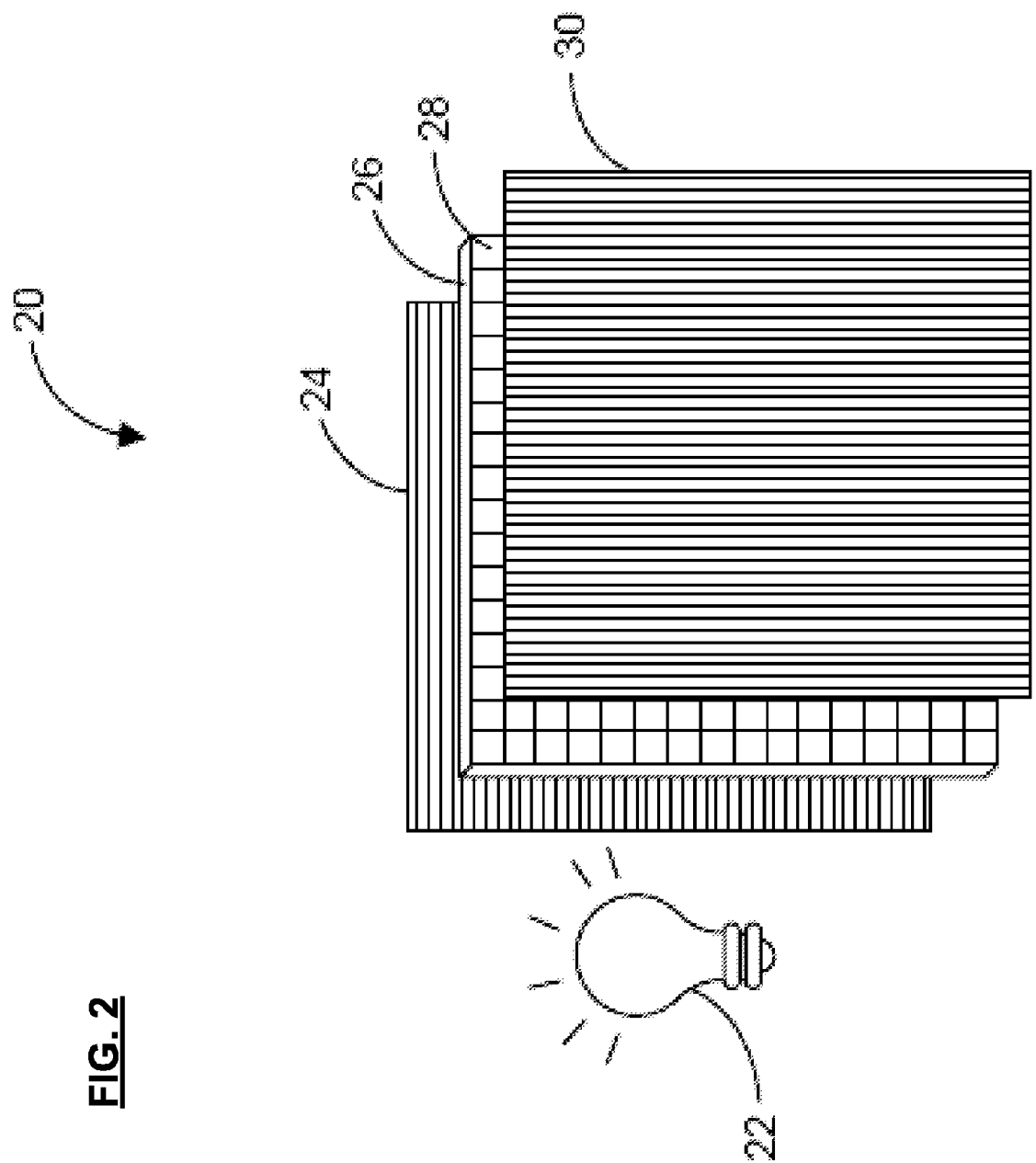
FIG. 2 is a schematic representation of an embodiment of the present invention, illustrating an apparatus for displaying full resolution, high definition (HD) three-dimensional (3D) images in a liquid crystal display (LCD) device utilizing at least two sets of narrow band-pass color filters designed for red (R), green (G) and blue (B) colors.

FIG. 2 is a schematic representation of an embodiment of the present invention, illustrating an apparatus 20 for displaying full resolution, high definition (HD) three-dimensional (3D) images in a liquid crystal display (LCD) device utilizing at least two sets of narrow band-pass color filters 28 designed for red (R), green (G) and blue (B) color signals (e.g., alternating columns/rows of RGB1, RGB2, . . . , or columns/rows of R1R2G1G2B1B2 . . . , or columns/rows of other repeating orders of the 6 color filters).

The apparatus 20 comprises at least one polarizer panel 24 utilized for orienting the polarization of the backlight, and an LCD array comprising a plurality of pixels 26 for modulating light according to image data for the display of images. The modulation is performed in a 3D display, for example, by modulating pixels of the LCD array coincident with RGB1 filters according to image data of a first view, and modulating pixels of the LCD array coincident with RGB2 filters according to image data of a second view. The spectral properties of the RGB1 and RGB2 filters cause the first and second views to be separated, and separately viewed through viewing filters encompassing the wavelengths of RGB1 and RGB2 (e.g., glasses having a left eye lens with a filter encompassing RGB1 and a right eye lens with a filter encompassing RGB2). Typically, a viewing filter excludes wavelengths of the other view.

However, in at least one embodiment, some wavelengths are shared by both views and the invention includes identifying pixels or areas of an image where both left and right views have the same (or nearly identical) pixel data which can be displayed using wavelengths common to both channels. This may be implemented, for example, with a 9 band filters, RGB1, RGB2, RGB3, where RGB1 represents a first view, RGB2 represents a second view, and RGB3 represents areas common to both views. The common view may be implemented, for example, via additional pixels available in an 8K panel—maintaining full resolution of both views and increasing brightness and/or brightness of highlights.

More generally, pixel data common to the first and second views may be displayed using a medium common to both views. The medium may be any of spectral properties of viewing filters, polarization properties of viewing filters, and auto-stereoscopic display techniques (e.g., lenslets directing one view to a left eye, one view to a right eye, and the common view to both eyes).

The apparatus 20 further comprises at least one analyzer panel 30 that causes the light to be selectively filtered according to the modulation imparted by the LCD array. The apparatus 20 may be adapted for displaying two-dimensional (2D) images without using 3D glasses.

Figure 3:
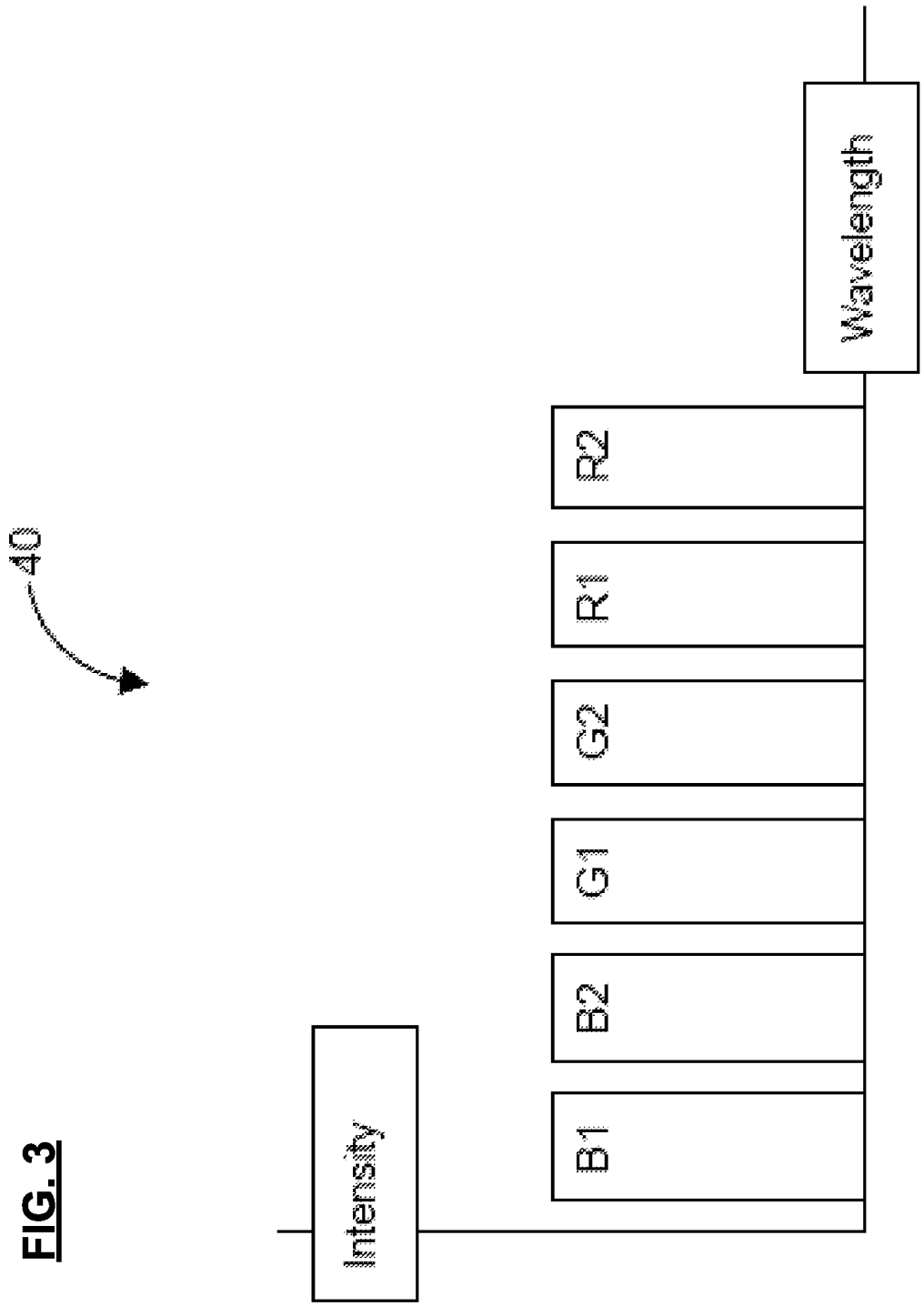
FIG. 3 is a graphical representation of an embodiment the present invention, illustrating a wavelength-intensity plot of at least two sets of narrow band-pass color filters.

FIG. 3 is a graphical representation of an embodiment of the present invention, illustrating a wavelength-intensity plot 40 of the at least two sets of narrow band-pass color filters (e.g., RGB1, RGB2). Each filter includes, for example, a narrow band-pass of a portion of Red, Green, and Blue spectrum. As noted above, a viewer's 3D glasses have corresponding or encompassing filters. There may be several bands of each primary for each viewpoint. It is desirable for both sets of RGB1 and RGB2 to have identical or nearly identical responses when viewed without 3D glasses (e.g., they are metameric with a standard observers' cone responses), which minimizes the need for color balancing processing. The at least two sets of narrow-band pass color filters may be arranged in a vertical, horizontal, or other interlaced pattern.

Figure 4:
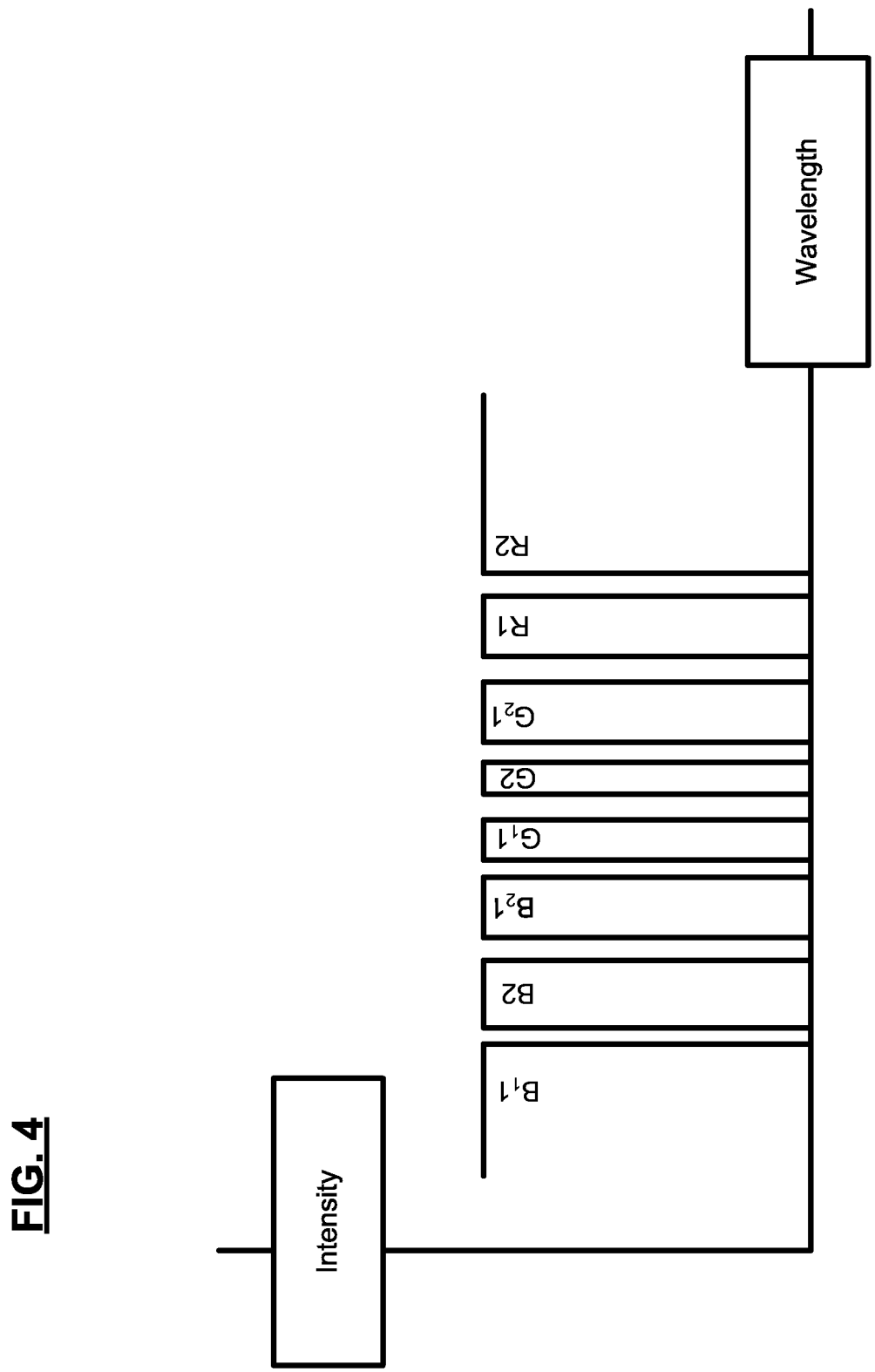
FIG. 4 is a graphical representation of an embodiment of the present invention, illustrating a wavelength plot for two sets of narrow band-pass color filters including open ended (high/low pass filters) and band pass filters, and notch filters between different colors of a same band in a same channel.

FIG. 4 is a graphical representation of an embodiment of the present invention, illustrating a wavelength-intensity plot 45 of two sets of narrow band-pass color filters (R1G1B1, R2G2B2). A first view filter includes, for example, a narrow band-pass of a portion of Red, Green, and Blue spectrum. A second view filter comprises multiple narrow band-pass color filters for Blue and Green wavelengths, and notch bands between at least 2 different pass bands (e.g., a first notch band between Blue and Green of the same view, and a notch band between Green and Red of the same view). The additional wavelengths and notch bands may be calculated, for example, to achieve the desired color balance between the views. Viewing filters may encompass all of the bands of each corresponding view, including the notch bands which block wavelengths from being emitted in the second view.

The invention and its various embodiments described herein may be adapted for utilizing vertical, horizontal or checkerboard interlacing techniques. The checkerboard interlacing technique used for grouping multiple primary colors in a single channel minimizes interlacing artifacts such as motion breakups.

Figure 5:
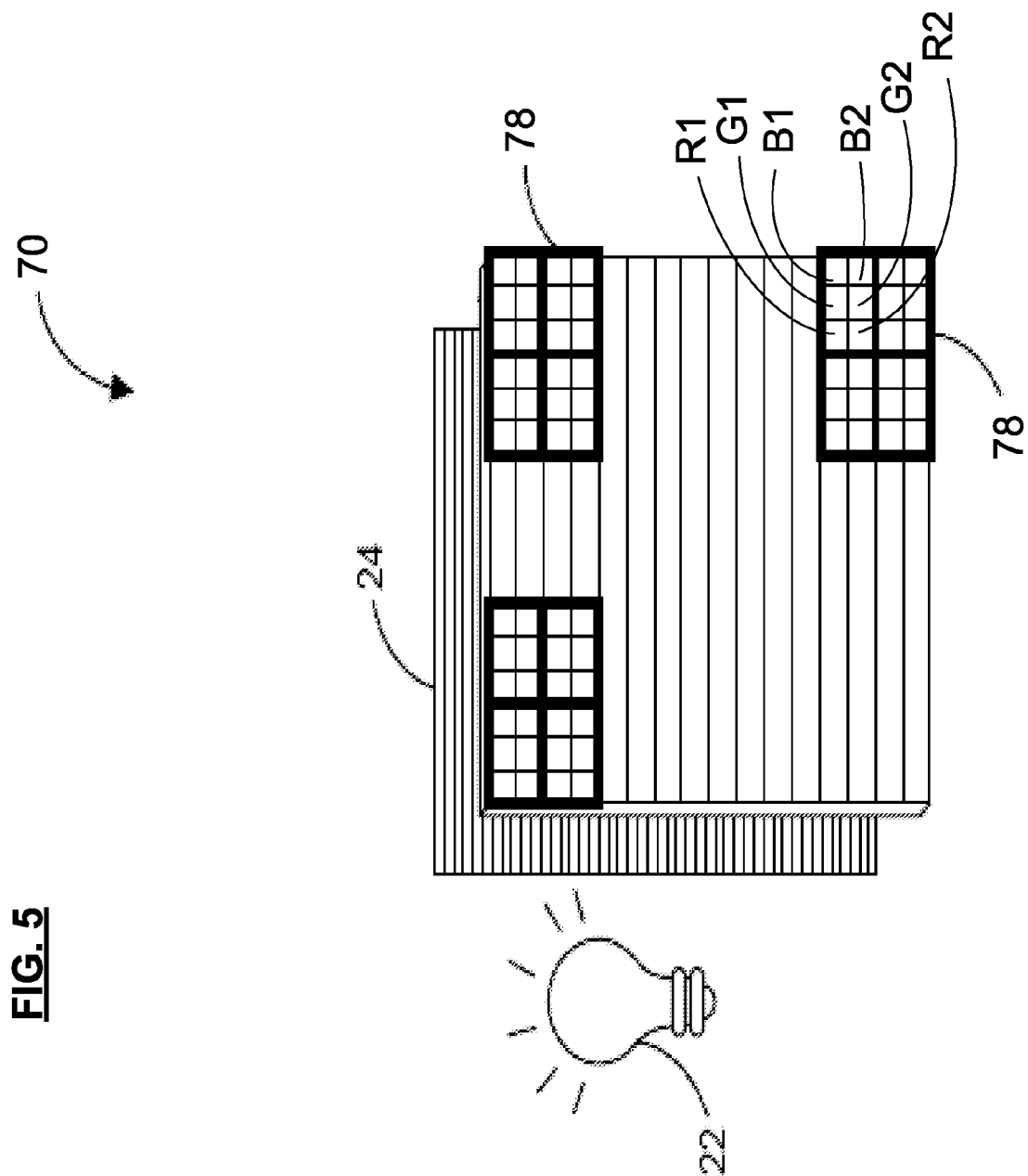
FIG. 5 is a schematic representation of an embodiment of the present invention, illustrating an exemplary sub-pixel configuration of least two sets of narrow band-pass color filters.

FIG. 5 is a schematic representation of an embodiment of the present invention, illustrating a sub-pixel configuration of two sets of narrow band-pass color filters (R1G1B1 and R2G2B2). When a viewer is wearing 3D glasses for viewing a 3D image, there is approximately 50% loss of light output due to only half the light being allowed through each eye by the 3D glasses. Although light is reduced compared to a 4 k display, the present invention preserves light output to the viewer compared to a standard 2D panel when the viewer is not wearing 3D glasses (same number of pixels are providing full brightness compared to a standard 2D panel). If the viewer is not wearing 3D glasses, the apparatus 70 can be controlled by a 2D mode to display either HD with a resolution of 1920×1080 pixels by controlling each set of four pixels (e.g., pixel groups 78) together or 4K modes by controlling each pixel individually (e.g., controlling R1G1B1 and R2G2B2 individually and for a same image/view).

The 4K LCD device is designed for providing a display resolution of 3840×2160 pixels. The left viewpoint of the 4K LCD device provides a resolution of 1920×1080 pixels and the right viewpoint of the 4K LCD device provide a resolution of 1920×1080 pixels. The method may be adapted for displaying two-dimensional (2D) images by controlling sets of four pixels (adjacent pixels in 2 rows and 2 columns) together with a resolution of 1920×1080 pixels. The method may be adapted for displaying two-dimensional (2D) images in a 4K mode by controlling each pixel separately with a resolution of 3840×2160 pixels.

The foregoing description of the preferred embodiment of the present invention has been presented for the purpose of illustration and description. It is not intended to be exhaustive or to limit the invention to the precise form disclosed. Many modifications and variations are possible in light of the above teachings. Parts or components of the invention as described may be substituted with other parts or components of similar functionality. For example, although described mainly by LCD technologies, the present invention may implemented using Micro Electro Mechanical Systems or devices (MEMS based devices, e.g., MEMS shutter technology). Other technologies including projection technologies, micro-mirror modulators (e.g., DMDs), Liquid Crystal on Silicon (LCoS) modulators, and others are also suitably equipped or easily modified or programmed by the ordinarily skilled artisan upon review of the present disclosure to implement one or more features of the invention. It is intended that the scope of the present invention not be limited by this detailed description, but by the claims and the equivalents to the claims appended hereto.

What is claimed is:

1. A method for displaying full resolution, high definition (HD) three-dimensional (3D) images in a liquid crystal display (LCD) device, the method comprising:
    spatially dividing pixels of said LCD device into left and right views;
    modulating said pixels of said LCD device based on image data to simultaneously generate a full left view and a full right view;
    analyzing light from a first set of pixels displaying said left view in full resolution with an analyzer of a first type;
    analyzing light from a second set of pixels displaying said right view in full resolution with an analyzer of a second type; and
    analyzing light from a third set of pixels associated with a common view with an analyzer of a third type; and wherein
    said analyzer of said first type includes a first set of color filters and a polarizer, said first set of color filters being aligned with said first set of pixels and configured to pass a first set of wavelengths comprising at least three bands;
    said analyzer of said second type includes said polarizer and a second set of color filters different from said first set of color filters, said second set of color filters being aligned with said second set of pixels and configured to pass a second set of wavelengths comprising at least three bands different than said bands of said first set of wavelengths;
    said analyzer of said third type includes said polarizer and a third set of color filters aligned with said third set of pixels, said third set of color filters being configured to pass a third set of wavelengths comprising at least three bands;
    said first and second sets of wavelengths facilitate separation of said left view and said right view by different lenses of eyewear;
    said third set of wavelengths facilitates said common view by passing through each of said different lenses of eyewear;
    pixel data common to said left view and said right view are displayed using said third set of pixels; and
    each pixel belongs to only one of said first set of pixels, said second set of pixels, and said third set of pixels.

2. The method of claim 1, wherein the steps of analyzing light from said first set of pixels and said second set of pixels comprises alternating portions of said analyzer of said first type and portions of said analyzer of said second type in one of a vertical, horizontal, and checkerboard interlace pattern.

3. The method of claim 2, wherein the LCD device comprises a 4K LCD device designed for providing a display resolution of 3840×2160 pixels.

4. The method of claim 2, wherein each of the full left view and the full right view of the LCD device provides a resolution of 1920×1080 pixels.

5. The method of claim 3, wherein the method may be adapted for displaying two-dimensional (2D) images by controlling sets of four pixels together with a resolution of 1920×1080 pixels.

6. The method of claim 3, wherein the method may be adapted for displaying two-dimensional (2D) images in a 4K mode by controlling each pixel separately with a resolution of 3840×2160 pixels.

7. An apparatus for displaying full resolution, high definition (HD) three-dimensional (3D) images in a liquid crystal display (LCD) device, the apparatus comprising:
    a light source;
    at least one polarizing panel utilized for orienting polarization of light emitted from the light source;
    a modulating array configured to modulate light emitted from the light source according to image data for both a full first view and a full second view simultaneously;
    an analyzer panel configured to effect the modulation imparted into the light by the modulating array; and
    an optical separator configured to optically separate the first view and second view, the optical separator comprising a first set of filters aligned with a first set of pixels displaying the first view in full resolution and configured to pass a first set of wavelengths comprising at least three bands, a second set of filters aligned with a second set of pixels displaying the second view in full resolution and configured to pass a second set of wavelengths comprising at least three bands different than the bands of said first set of wavelengths, and a third set of filters aligned with a third set of pixels associated with a common view and configured to pass a third set of wavelengths comprising at least three bands; and wherein the first and second sets of wavelengths facilitate separation of the first view and the second view by different lenses of eyewear;

the third set of wavelengths facilitates the common view by passing through each of the different lenses of eyewear;

pixel data common to the first view and the second view are displayed using the third set of pixels; and each pixel belongs to only one of the first set of pixels, the second set of pixels, and the third set of pixels.

8. The apparatus according to claim 7, further comprising the eyewear, the eyewear having a first viewing filter configured to pass the first set of wavelengths and a second viewing filter configured to pass the second set of wavelengths.

9. The apparatus according to claim 8, wherein the first set of wavelengths contains a different number of bands compared to the second set of wavelengths.

10. The apparatus according to claim 8, wherein the second set of wavelengths comprises at least 5 bands.

11. The apparatus according to claim 10, wherein at least one of the first set of filters and the second set of filters comprises a high pass filter or a low pass filter.

12. The apparatus according to claim 11, wherein at least one of the first and second sets of wavelengths is defined by a notch filter that blocks light between different colors of a same view.

13. The apparatus according to claim 12, wherein:

the first and second viewing filters are respectively disposed on first and second lenses of the eyewear; and wherein the first viewing filter passes the wavelengths of the first set of wavelengths and any notch bands between bands of the first set of wavelengths; and the second viewing filter passes wavelengths of the second set of wavelengths and any notch bands between bands of the second set of wavelengths.

14. The apparatus according to claim 13, wherein the LCD device comprises a 4K LCD device designed for providing a display resolution of 3840×2160 pixels in 2D mode and 1920×1080 pixels in each view in 3D mode.

15. The apparatus according to claim 7, wherein the light source is locally dimmed and pixels of the modulating array are adjusted on a view-by-view basis to compensate for variations in illumination for each pixel or group of pixels.

16. A display comprising:

a light source;

a spatial light modulator configured to impart an image into light emitted from said light source to generate a full first view and a full second view, said spatial light modulator including an array of pixels, said array of pixels including a first set of pixels controlled by data corresponding to said first view and displaying said first view in full resolution, a second set of pixels controlled by data corresponding to said second view and displaying said second view in full resolution, and a third set of pixels controlled by data corresponding to a common view associated with said first view and said second view, said pixels of said first set, said second set, and said third set being interspersed within said array; and an analyzer operative to effect the modulation imparted into said light by said first set of pixels, said second set of pixels, and said third set of pixels, to impart a first optical characteristic into said modulated light from said first set of pixels, to impart a second optical characteristic different from said first optical characteristic into said modulated light from said second set of pixels, and to impart a common optical characteristic into said modulated light from said third set of pixels; and wherein said first optical characteristic is a first set of constituent wavelengths comprising at least three bands;

said second optical characteristic is a second set of constituent wavelengths comprising at least three bands different from said bands of said first set of constituent wavelengths;

said third optical characteristic is a third set of constituent wavelengths comprising at least three bands;

said first and second sets of constituent wavelengths facilitate separation of said first view and said second view by different lenses of eyewear;

said third set of constituent wavelengths facilitates said common view by passing through each of said different lenses of eyewear; and each pixel belongs to only one of said first set of pixels, said second set of pixels, and said third set of pixels.

17. The display of claim 16, wherein the spatial light modulator comprises one of a Micro Electro Mechanical System (MEMS) based display panel and an LCD panel.

18. The method of claim 1, wherein said polarizer is configured to effect modulation imparted into said light from said first set of pixels, said second set of pixels, and said third set of pixels.

19. An apparatus for displaying full resolution, high definition (HD) three-dimensional (3D) images in a liquid crystal display (LCD) device, the apparatus comprising:

a light source;

at least one polarizing panel utilized for orienting polarization of light emitted from the light source;

a modulating array configured to modulate light emitted from the light source according to image data for both a full first view and a full second view simultaneously; and an optical separator configured to optically separate the first view and second view, the optical separator including an analyzer panel configured to effect the modulation imparted into the light by the modulating array; and wherein the light source is locally dimmed and pixels of the modulating array are adjusted on a view-by-view basis to compensate for variations in illumination for each pixel or group of pixels;

the optical separator comprises a first set of filters aligned with a first set of pixels displaying the first view in full resolution and configured to pass a first set of wavelengths comprising at least three bands, a second set of filters aligned with a second set of pixels displaying the second view in full resolution and configured to pass a second set of wavelengths comprising at least three bands different than the bands of said first set of wavelengths, and a third set of filters aligned with a third set of pixels associated with a common view and configured to pass a third set of wavelengths comprising at least three bands;

the first and second sets of wavelengths facilitate separation of the first view and the second view by different lenses of eyewear;

the third set of wavelengths facilitates the common view by passing through each of the different lenses of eyewear;

pixel data common to the first view and the second view are displayed using the third set of pixels; and each pixel belongs to only one of the first set of pixels, the second set of pixels, and the third set of pixels.

20. The apparatus according to claim 19, wherein the LCD device comprises a 4K LCD device designed for providing a display resolution of 3840×2160 pixels in a 2D mode and 1920×1080 pixels in each view in 3D mode.

\* \* \* \* \*